United States Patent Office 2,786,043
Patented Mar. 19, 1957

2,786,043

PLASTICIZED ACRYLONITRILE COMPOSITIONS

Walter H. Schuller, Stamford, and Edward J. Kerle, South Norwalk, Conn., assignors to American Cyanamid Company, New York, N. Y., a corporation of Maine No Drawing. Application September 27, 1955, Serial No. 537,034

9 Claims. (Cl. 260—45.5)

This invention relates to new and useful compositions of matter and, more particularly, to compositions comprising an acrylonitrile polymerization product which has been plasticized with a polymer of N-vinyl-2-oxazolidone. These compositions are particularly useful in the production of shaped articles therefrom, e. g., films, filaments, threads, rods, tubes and the like. The acrylonitrile polymerization products which are plasticized with a polymer of N-vinyl-2-oxazolidone in practicing the present invention are those which contain in the polymer molecules thereof an average of at least 75% by weight of acrylonitrile (combined acrylonitrile); in other words, the acrylonitrile polymerization product may either homopolymeric acrylonitrile or a copolymer of acrylonitrile containing in its molecules an average of at least 75% by weight of acrylonitrile. The preferred polymers of N-vinyl-2-oxazolidone which are used in carrying our invention into effect are those which have an average molecular weight of at least 300, and especially those which have an average molecular weight of at least 400, e. g., from 500 to 10,000 or 12,000 or more.

Various methods of producing filaments, films and other shaped articles from polyacrylonitrile (polymeric acrylonitrile) and from copolymers or interpolymers of a major proportion of acrylonitrile and a minor proportion of another monomer or monomers, e. g., a polymerization product containing in the polymer molecules an average of at least 75% by weight of acrylonitrile, heretofore have been suggested. For example, in Kropa and Thomas U. S. Patent No. 2,520,150 dated August 29, 1950, it is proposed that 5-chloromethyl-2-oxo-oxazolidine be used either as a solvent or as a plasticizer for a polymer of acrylonitrile. Also, in Caldwell U. S. Patent No. 2,656,-328 dated October 20, 1953, it is suggested that polymers of acrylonitrile, containing in the polymer molecules less than about 90% by weight of acrylonitrile, be plasticized with a plasticizing amount of one of the class of N-substituted ethylene carbamates exemplified by N-ethyl and N-phenyl ethylene carbamates.

N-vinyl-2-oxazolidone is a new chemical compound as are also the homopolymers and copolymers thereof with other copolymerizable substances such as the different vinyl compounds and unsaturated alkyd resins. Monomeric N-vinyl-2-oxazolidone and homopolymers and copolymers thereof are disclosed and claimed in the copending application of Erhart K. Drechsel, Serial Number 430,740, filed May 18, 1954, while the copolymers of N-vinyl-2-oxazolidone and unsaturated alkyd resins are specifically claimed in Erhart K. Drechsel copending application, Serial Number 481,711, filed January 13, 1955, as a division of the aforementioned copending application Serial Number 430,740. N-vinyl-2-oxazolidone is prepared as is described more particularly in the aforementioned copending applications, and which briefly involves dehydrochlorination of N-(beta-chloroethyl)-oxazolidone with metallic potassium while the N-(beta-chloroethyl)-oxazolidone is dissolved in tertiary butanol. Other methods of preparation also can be used. The polymer of N-vinyl-2-oxazolidone is prepared from the monomer by conventional methods, preferably with the aid of a polymerization catalyst.

The present invention is based on our discovery that polymers and copolymers of acrylonitrile, more particularly homopolymeric acrylonitrile and thermoplastic copolymers of acrylonitrile, specifically such copolymers containing in their molecules an average of at least 75% by weight of combined acrylonitrile, e. g., copolymers of, by weight, from 75% to 99.5% of acrylonitrile and another monomer such, for instance, as vinyl acetate, methyl acrylate, ethyl acrylate, acrylamide, etc., are compatible with a polymer of N-vinyl-2-oxazolidone and that the latter is capable of plasticizing the acrylonitrile polymerization product to yield plasticized compositions which are suitable for use in making a wide variety of shaped or fabricated articles, including mono- and multifilaments, threads, yarns, films, bars, etc., therefrom. These plasticized compositions can be easily shaped, as by extrusion or molding, into a wide variety of useful articles of manufacture for industrial and other applications. The polymer of N-vinyl-2-oxazolidone may be used either as a fugitive or temporary plasticizer, that is, a plasticizer which subsequently is removed from the acrylonitrile polymerization product, or as a permanent plasticizer which is permitted to remain in the shaped homopolymer or copolymer of acrylonitrile.

Homopolymeric acrylonitrile and acrylonitrile copolymers (thermoplastic acrylonitrile copolymers) containing in the polymer molecules an average of at least 75% by weight of acrylonitrile (combined acrylonitrile) are employed in carrying the present invention into effect. These acrylonitrile polymerization products are prepared by methods now well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 75% by weight of combined acrylonitrile. The expression "polymerization product containing in the polymer molecules an average of at least 75% by weight of acrylonitrile," as used herein and in the appended claims, means a polymerization product (homopolymer, copolymer or graft polymer or mixtures thereof) containing in the molecules thereof an average of at least 75% by weight of the acrylonitrile unit, which is considered to be present in the individual polymer molecule as the group

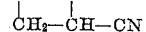

or, otherwise stated, at least 75% by weight of the reactant substance converted into and forming the polymerization product is acrylonitrile.

Illustrative examples of monomers which may be copolymerized with acrylonitrile to yield a polymerization product containing in the polymer molecules an average of at least 75% by weight of acrylonitrile are compounds containing a single $CH_2=C<$ grouping, for instance, the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl-type alcohols, e. g., allyl alcohol, methallyl alcohol, ethallyl alcohol, etc.; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $$CH_2=C<$$

grouping which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least 75% by weight of acrylonitrile. Thus, when the polymerization rate of the monomers present in the polymerizable mixture is substantially the same, the proportions may be, for example, from, by weight, about 75% to about 99% of acrylonitrile to from about 25% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50% by weight thereof in order to obtain a polymerization product containing in the copolymer molecules an average of at least 75% by weight of acrylonitrile.

Any suitable method of polymerizing the monomeric acrylonitrile or mixture of monomers may be employed, and the resulting polymerization product may be of any suitable molecular weight. Ordinarily the molecular weight (average molecular weight) of the acrylonitrile polymerization product used in practicing our invention is within the range of 25,000 or 30,000 to 200,000 or 300,000 or higher, and advantageously is of the order of 50,000 to 100,000, e. g., about 70,000–80,000, as calculated from a viscosity measurement of the said polymerization product in dimethyl formamide using the Staudinger equation (reference: U. S. Patent No. 2,404,713).

The plasticization of the acrylonitrile polymerization product with the polymer of N-vinyl-2-oxazolidone is preferably effected with the aid of a mutual solvent, e. g., dimethyl formamide. All or part of the dimethyl formamide (or other mutual solvent) can then be removed, as desired or as may be required, by any suitable means, e. g., by evaporation or distillation, or by extraction with an agent which is a solvent for the dimethyl formamide but a non-solvent for the polyacrylonitrile and poly-N-vinyl-2-oxazolidone. To avoid or minimize discoloration of the homopolymeric or copolymeric acrylonitrile and/or of the poly-N-vinyl-2-oxazolidone, it is generally advantageous to employ the lowest possible temperature in effecting plasticization of the acrylonitrile polymerization product, which temperature is consistent with practical considerations, e. g., the time required for carrying out the process.

The proportions of the acrylonitrile polymerization product and the poly-N-vinyl-2-oxazolidone (homopolymeric N-vinyl-2-oxazolidone) in the compositions of our invention may be varied widely, depending mainly upon the particular use for which the composition is intended. For some applications, e. g., where the plasticizer is intended to be permanent, and the plasticized composition will not come in contact with a solvent for the poly-N-vinyl-2-oxazolidone, the later may constitute 50%, or even as much as 70% or 75%, by weight of the total amount of the acrylonitrile polymerization product and the polymer of N-vinyl-2-oxazolidone. In other applications, e. g., when the palsticized composition is to be extruded through an orifice to form filaments (mono- or multifilaments), then the acrylonitrile polymerization product is generally plasticized with a plasticizing amount not substantially exceeding about 25% (e. g., from 1% to about 10% or 15%), by weight of the composition, of a plasticizer comprising a polymer of N-vinyl-2-oxazolidone, advanatgeously such a polymer having an average molecular weight of at least about 400, e. g., from 500 to 20,000 or 30,000 or even as high as 40,000 or 50,000 or more.

In the average or most commonly employed plasticized compositions of this invention it may be stated, without intending to limit the scope of the invention, that the composition will comprise (1) a polymerization product containing in the polymer molecules an average of at least 85% by weight of acrylonitrile, and (2) a polymer of N-vinyl-2-oxazolidone having an average molecular weight of at least 400 and being present in the said composition in an amount corresponding to from about 1% to about 50% by weight of the total of (1) and (2).

The aforementioned ranges of proportions are mentioned as indicative of proportions that may be employed in forming our new plasticized acrylonitrile polymerization products, and our invention obviously is not limited to the use of only such proportions. The important factor is that the proportions be such that the plasticity of the composition at the operating temperature is within a workable range.

The compositions described above may be used in the production of various fabricated structures such, for example, as filaments, bars, rods, tubes, etc., in accordance with general techniques and using apparatus now generally known to those skilled in the art, the detailed operating conditions being suitably modified where required. Reference is made to the aforementioned patents for both general and somewhat more specific descriptions of practices and apparatus employed. Solutions of the plasticized compositions in a mutual solvent, e. g., dimethyl formamide, may be cast as films, and the solvent then partly or completely evaporated to yield a solid film of the plasticized acrylonitrile polymerization product.

In the production of filamentary material which shows orientation along its longitudinal axis, the plasticized composition is extruded through a spinnerette or die, after which all or part or none of the plasticizer can be removed (e. g., by solvent extraction), as desired or as conditions may require. Thereafter the acrylonitrile polymerization product is stretched to effect the desired orientation. This increases the tensile strength and otherwise improves the properties of the filamentary material. Orientation may be effected by stretching the thread or strand at any suitable stage of the spinning operation. Advantageously, in some cases, spun filament or thread is stretched while it still contains at least some of the plasticizer. Stretching may be accomplished by passing the thread or yarn between two or more positively driven rollers or godets, the peripheral speeds of which are adjusted so that the thread is stretched to the desired degree.

The amount of stretch that is applied to the filament or strand may be varied widely, but in all cases should be sufficient to cause at least appreciable orientation of the molecules and an improvement in the properties of the material undergoing treatment. The amount of tension to which the strand is subjected obviously should not be so great as to cause it to break. Depending, for example, upon the type or kind of material being stretched and the particular properties desired in the finished product, the amount of stretch may vary, for instance, from 100%, preferably from 200% or 300%, up to 1000% or more of the original length of the filament or strand. The stretch may be applied gradually by passing the thread over a plurality of godets having increasing peripheral speeds. The stretched thread may be wound upon a spool or it may be collected in a centrifugal pot, whereby twist advantageously is applied to the thread. Alternatively, the stretched thread may be led over a thread-storage device on which it may be treated with a suitable solvent to remove all or part of the liquid coagulant (employed in those cases where a wet-spinning process is used in forming the thread from a liquid solvent solution of the plasticized acrylonitrile polymerization product) and/or to remove the poly-N-vinyl-2-oxazolidone. Thereafter the thread may be continuously dried, oiled and taken up on a twisting device such, for instance, as a ring twisting spindle.

The extruded filament or thread may be given part or all of its total stretch while it is being passed through a gaseous medium, e. g., air, nitrogen, flue gases, etc., or through a liquid medium, e. g., water or other solvent for poly-N-vinyl-2-oxazolidone if it is desired to extract some or all of the latter from the plasticized polyacrylonitrile; or xylene or other non-solvent for poly-N-vinyl-2-oxazolidone if it is desired to retain the latter in the composition. To obviate or minimize discoloration of the acrylonitrile polymerization product and to avoid or minimize decomposition of the poly-N-vinyl-2-oxazolidone, the temperature of the medium in which the plasticized polyacrylonitrile is stretched and the rate of travel of the strand through the medium should be so adjusted that overheating of the strand does not occur.

The highly stretched product is strong, tough and pliable, and shows a high degree of orientation along its longitudinal axis by X-ray diffraction.

In order that those skilled in the art better may understand how the present invention can be carried into effect, the following examples are given by way of illustration and not by way of limitation. All parts are by weight.

*Example 1*

Thirty percent (30%) by weight, based on the amount of homopolymeric acrylonitrile, of poly-N-vinyl-2-oxazolidone (homopolymeric N-vinyl-2-oxazolidone) having an average molecular weight within the range of about 400 to 800 is added to a 10% solution of homopolymeric acrylonitrile dissolved in dimethyl formamide, the latter being at room temperature (20°-30° C.). The mixture is stirred at room temperature or with slight warming until a homogeneous solution results. The above percentage proportion of poly-N-vinyl-2-oxazolidone, based on the amount of homopolymeric acrylonitrile, corresponds to about 23.1% of the total amount of polyacrylonitrile and poly-N-vinyl-2-oxazolidone.

A film of the solution prepared as described above is cast on glass and dried in a 105° C. forced-draft oven for 1½ hours, or longer if necessary, until substantially all of the dimethyl formamide has been evaporated. After removal from the oven and cooling to room temperature, the dried film is peeled from the glass plate. When subjected to a pull between the fingers, the film can be stretched considerably without tearing. In marked contrast a similarly prepared film made from a 10% solution of polyacrylonitrile alone in dimethyl formamide shows no stretchability under the same test conditions.

The above test indicates qualitatively the plasticizing effect of the poly-N-vinyl-2-oxazolidone on the polyacrylonitrile.

*Example 2*

Example 1 is repeated but varying the proportion of poly-N-vinyl-2-oxazolidone to produce compositions containing 5%, 15%, 35% and 45% by weight of poly-N-vinyl-2-oxazolidone, based on the total weight of poly-N-vinyl-2-oxazolidone and polyacrylonitrile. Similar results are obtained, the films containing the higher percentages of poly-N-vinyl-2-oxazolidone showing, in general, the greater stretchability, that is to say, they are more highly plasticized.

*Example 3*

Example 1 is repeated but using, instead of homopolymeric acrylonitrile, the following copolymers of acrylonitrile in individual tests:

Copolymer produced from a mixture of:

(1) 95% acrylonitrile and 5% methyl acrylate
(2) 90% acrylonitrile and 10% acrylamide
(3) 90% acrylonitrile and 10% vinyl acetate
(4) 85% acrylonitrile and 15% methyl acrylate
(5) 95% acrylonitrile and 5% acrylic acid
(6) 90% acrylonitrile and 10% hydroxyethyl methacrylate
(7) 98% acrylonitrile and 2% styrene
(8) 85% acrylonitrile, 7.5% methyl acrylate and 7.5% 2-methyl-5-vinylpyridine
(9) 75% acrylonitrile, 12.5% methyl acrylate and 12.5% vinyl acetate In each case the poly-N-vinyl-2-oxazolidone exerts a plasticizing effect on the acrylonitrile copolymer when using the same test described under Example 1.

*Example 4*

Example 1 is repeated but using, instead of the particular poly-N-vinyl-2-oxazolidone and amount thereof employed in that example, 25%, based on the weight of the homopolymeric acrylonitrile, of a polymer of N-vinyl-2-oxazolidone (that is, homopolymeric N-vinyl-2-oxazolidone) having an average molecular weight between about 1000 and 2000. Similar results are obtained.

*Example 5*

Ninety-five (95) parts of homopolymeric acrylonitrile having an average molecular weight of about 80,000 and 5 parts of poly-N-vinyl-2-oxazolidone having an average molecular weight of about 20,000 are separately ground to a particle size of 20 mesh (20 meshes per inch) and individually added to 400 parts of dimethyl formamide at room temperature or lower, and the mixture is subjected to vigorous stirring. While protected by a blanket of nitrogen the temperature is raised gradually over a period of about 1 hour to about 50° or 60° C. with slow stirring until all of the aforesaid polymers have dissolved in the dimethyl formamide to form a clear solution.

After deaeration and filtration the solution, heated to about 120°-130° C., is extruded downwardly through a spinnerette having 40 holes, each 70 microns in diameter, into a spinning cell, the inner wall of which is maintained at a temperature of approximately 400° C. by means of a fluid heating medium which circulates around the outer wall of the cell. A current of preheated gas (specifically air) at 100° C. is introduced at the bottom of the cell and passes upwardly countercurrent to the filaments which pass downwardly from the spinnerette. The waste gas leaves the upper portion of the cell at about 200° C. By this means the dimethyl formamide is evaporated from the filaments by the time the filaments have reached the bottom of the cell, since the length of the cell is sufficient to effect this result.

From the bottom of the cell the group of filaments or thread is collected on a rotating bobbin, after which it is unwound, passed without slippage about a positively driven roller, which is heated to a temperature of about 105° C. It is then wound on a rotating bobbin, the peripheral speed of which is ten times that of the heated roller. The filaments are oriented along the fiber axis by this stretching operation. The poly-N-vinyl-2-oxazolidone so plasticizes the polyacrylonitrile that the thread can be more highly stretched than otherwise is possible; that is, as compared with a thread which has been made under the same conditions from an unplasticized polyacrylonitrile. The advantages of this will be immediately apparent to those skilled in the art, since it is well-known that the more highly a filament can be molecularly oriented along the fiber axis, as by stretching, the greater is the improvement in its useful properties.

If desired, the plasticizer comprising the poly-N-vinyl-2-oxazolidone can be removed, e. g., by extraction with a suitable solvent, after the filaments have been molecularly oriented along the fiber axis.

Instead of using a polymer of N-vinyl-2-oxazolidone (homopolymeric N-vinyl-2-oxazolidone) alone as a plasticizer for acrylonitrile polymerization products of the kind with which the present invention is concerned, we can use the said poly-N-vinyl-2-oxazolidone in combination with other known plasticizers for homopolymeric or copolymeric acrylonitrile, and in any proportions. For instance, as a plasticizer for the aforementioned acrylonitrile polymerization product, we can use a concentrated aqueous solution containing a mixture of poly-N-vinyl-2-oxazolidone and a water-soluble inorganic salt (or plurality of such salts), more particularly such a salt or salts which yield highly hydrated ions in aqueous solutions, e. g., the chlorides, bromides, thiocyanates, perchlorates and nitrates, which salts are disclosed in, for example, Rein U. S. Patent No. 2,140,921. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Examples of other salts that can be employed in combination with poly-N-vinyl-2-oxazolidone in carrying the present invention into effect, more particularly in the form of an aqueous solution wherein the salt solution functions also as a solvent for the hereindescribed polymers and copolymers of acrylonitrile, are guanidine thiocyanate, the mono-(lower alkyl)-substituted guanidine thiocyanates and the symmetrical and unsymmetrical di-(lower alkyl)-substituted guanidine thiocyanates, which salts are more fully described (including their use as solvents for acrylonitrile polymerization products) in Cresswell U. S. Patent No. 2,533,224 dated December 12, 1950.

From the foregoing description it will be seen that the present invention provides compositions comprising (1) an acrylonitrile polymerization product containing in the polymer molecules thereof an average of at least 75% by weight of acrylonitrile, and (2) a polymer of N-vinyl-2-oxazolidone in an amount sufficient to plasticize the polymerization product of (1). These compositions can be shaped or fabricated, as by extrusion, molding, casting (from a solution thereof), etc., into a wide variety of useful articles. Lubricants, antistatic agents and other conventional modifiers of acrylonitrile polymerization products can be incorporated therein at any suitable stage of the operation. Although not limited thereto, the compositions of this invention are particularly useful in the production of filaments, threads, yarns, etc., which thereafter are woven into fabrics; in the production of molding compositions and molded articles; and also as capacitor dielectrics and in other applications of dielectrics. Other uses include those given in, for example, the patents mentioned elsewhere in this specification.

The term "filament" as used generically herein and in one of the appended claims is intended to include both monofilaments and multifilaments.

We claim:

1. A composition of matter comprising (1) a polymerization product containing in the polymer molecules an average of at least 75% by weight of acrylonitrile, and (2) a polymer of N-vinyl-2-oxazolidone in an amount sufficient to plasticize the polymerization product of (1).

2. A composition as in claim 1 where in the polymerization product of (1) is homopolymeric acrlyonitrile.

3. A composition as in claim 1 wherein the N-vinyl-2-oxazolidone polymer of (2) has an average molecular weight of at least 400.

4. A composition of matter comprising (1) a polymerization product containing in the polymer molecules an average of at least 85% by weight of acrylonitrile, and (2) a polymer of N-vinyl-2-oxazolidone having an average molecular weight of at least 400 and being present in the said composition in an amount corresponding to from about 1% to about 50% by weight of the total of (1) and (2).

5. A plasticized composition comprising a polymerization product containing in the polymer molecules an average of at least 85% by weight of acrylonitrile, said polymerization product being plasticized with a plasticizing amount not substantially exceeding about 25%, by weight of the composition, of a plasticizer comprising a polymer of N-vinyl-2-oxazolidone having an average molecular weight of at least 400.

6. A plasticized composition as in claim 5 wherein the acrylonitrile polymerization product is a homopolymer of acrylonitrile.

7. A plasticized composition as in claim 6 wherein the homopolymer of acrylonitrile has an average molecular weight within the range of 25,000 to 300,000.

8. A plasticized composition comprising a homopolymer of acrylonitrile, said homopolymer being plasticized with from 1% to 10%, by weight of the whole, of a polymer of N-vinyl-2-oxazolidone.

9. A filament which shows orientation along the fiber axis and which comprises a polymerization product containing in the polymer molecules an average of at least 75% by weight of acrylonitrile, said polymerization product being plasticized with a plasticizing amount not exceeding about 10% of a polymer of N-vinyl-2-oxazolidone.

No references cited.